United States Patent [19]

Gaughan

[11] Patent Number: 5,503,467
[45] Date of Patent: Apr. 2, 1996

[54] PNEUMATIC EMERGENCY BACKUP FOR ELECTRO-PNEUMATIC FREIGHT BRAKE

[75] Inventor: Edward W. Gaughan, Irwin, Pa.

[73] Assignee: Westinghouse Air Brake Company, Wilmerding, Pa.

[21] Appl. No.: 448,144

[22] Filed: May 23, 1995

[51] Int. Cl.[6] ........................................................ B60T 11/34
[52] U.S. Cl. .................... 303/3; 303/33; 303/38; 303/128
[58] Field of Search ...................... 303/3, 15, 33, 303/37, 38, 41, 28–29, 122.09, 122.15, 128

[56] References Cited

U.S. PATENT DOCUMENTS

| | | | |
|---|---|---|---|
| 4,776,642 | 10/1988 | Hart et al. | 303/38 X |
| 5,064,251 | 11/1991 | Romansky | 303/15 X |
| 5,358,315 | 10/1994 | Balukin | 303/15 |
| 5,393,129 | 2/1995 | Troiani et al. | 303/15 X |

Primary Examiner—Josie Ballato
Attorney, Agent, or Firm—Gary J. Falce

[57] ABSTRACT

A backup pneumatic emergency control valve for an electro-pneumatic brake system for a railroad freight car comprising an emergency portion of a standard AB type freight brake control valve device without the service portion. In the absence of a service portion in which the release function of an emergency brake application is normally provided, the emergency portion is modified to achieve this release function in one embodiment by venting the inshot valve control chamber to which brake cylinder pressure is typically connected via the high pressure spool valve during brake pipe recharge following an emergency brake application; and in another embodiment by replacing the accelerated emergency release check valve with a plug to isolate brake cylinder pressure in a backdump passage from the brake pipe and venting the check valve cavity to provide a means of exhausting brake cylinder pressure via the backdump passage when the backdump spool valve is moved to release position by the emergency piston during brakepipe recharge following an emergency brake application.

10 Claims, 5 Drawing Sheets

PNEUMATIC EMERGENCY BACKUP FOR ELECTRO-PNEUMATIC FREIGHT BRAKE

BACKGROUND OF THE INVENTION

The present invention is related to electro-pneumatic brake systems for railroad freight cars and particularly to a pneumatic backup brake control for the electrically controlled electro-pneumatic brake system.

Electro-pneumatic brake systems have been proposed for railroad freight cars which, when coupled in a train of such cars, will achieve a more uniform braking action throughout the train due to the near-instantaneous brake response at each car.

For purposes of convenience and cost effectiveness, it has been proposed to employ the existing freight brake control valve device for the pneumatic backup control, with the electro-pneumatic and pneumatic systems being separated by a double check valve device. Brake pipe pressure effective at each car normally remains charged to hold the freight brake control valve in its release position in a manner well-known to those in the railroad related industries. When a brake application is called for, the electro-pneumatic brake control system operates via the double check valve to control the brake pressure supplied to the car brake cylinder devices. In the event this pressure fails to develop, due to loss of electric power in the event of a train break-in-two, for example, brake pipe pressure would be concurrently depleted and the pneumatic backup brake control valve accordingly operated in response to such reduction of brake pipe pressure to apply brake pressure via the double check valve. While the pneumatic brake control valve is capable of applying brake pressure in graduated amounts dependent upon the degree of brake pipe pressure reduction, it will be appreciated that in a backup role, as herein proposed, the control valve is only required to apply full brake pressure.

SUMMARY OF THE INVENTION

It is therefore an object of the present invention to eliminate the standard AB freight brake control valve service portion and utilize only the emergency portion to provide pneumatic backup brake control for the electro-pneumatic brake system.

It is an extension of this objective to modify the standard AB freight brake control valve emergency portion to provide the brake release function normally provided by the service portion.

Briefly, these objectives are carried out by providing a pneumatic backup emergency control valve for a railroad freight car having a brake pipe, an emergency reservoir, brake means and an electro-pneumatic brake control. The pneumatic backup control valve comprises a first flow path via which fluid under pressure is connected from the emergency reservoir to the brake means and a second flow path via which fluid under pressure is released from the brake means to atmosphere. The second flow path is interrupted in a first position of a valve and established in a second position of the valve, which valve is operated to its second position by emergency means in response to the brake pipe being recharged following an emergency reduction of brake pipe pressure in accordance with an emergency brake application to release the emergency brake application.

BRIEF EXPLANATION OF THE DRAWINGS

These and other objects and advantages of the present invention will become apparent from the following more detailed explanation when taken in conjunction with the accompanying drawings in which.

DESCRIPTION AND OPERATION

Figure 1:
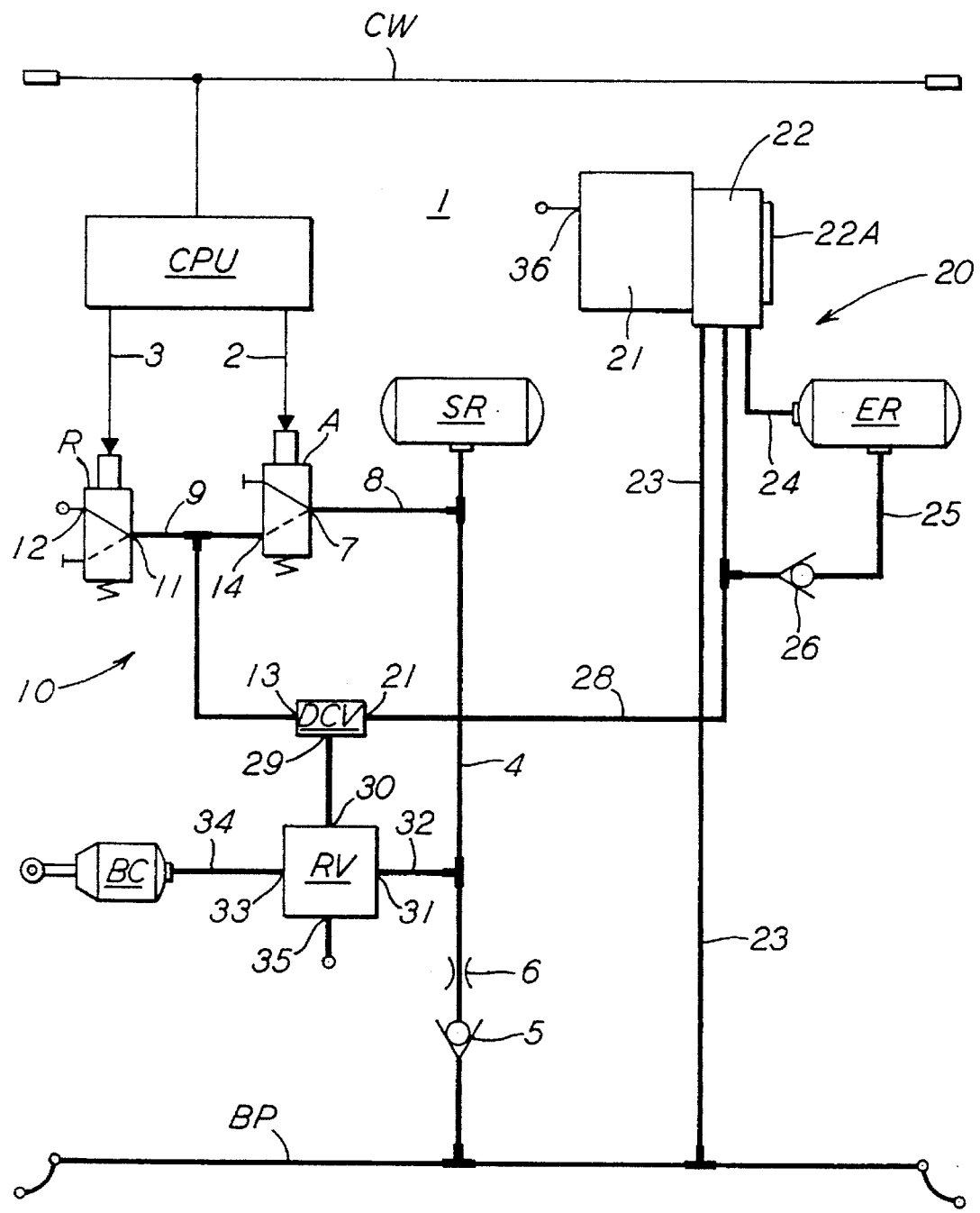
FIG. 1 is a schematic of a railroad freight car brake system in which an emergency portion of a pneumatic brake control valve is arranged with an electro-pneumatic brake system in a manner to provide an automatic pneumatic backup brake in the event of an electro-pneumatic brake failure.

Referring to FIG. 1 of the drawings, the brake system (1) includes an electro-pneumatic brake control (10), a pneumatic backup brake control (20), a brake cylinder device BC, a relay valve RV, a double check valve DCV that separates the respective electro-pneumatic and pneumatic backup brake controls, a control wire CW or alternatively a receiver for a radio communication link, and a brake pipe BP.

Electro-pneumatic brake control (10) comprises a microprocessor CPU to which control wire CW is connected, application and release, solenoid-operated, spring-returned, electro-pneumatic valves A and R that are controlled by microprocessor CPU via wires 2 and 3, and a supply air reservoir SR that is connected to brake pipe BP via a branch pipe (4) having a one-way check valve (5) and a choke (6). An inlet (7) of application valve A is connected to branch pipe (4) by a pipe (8), and a pipe (9) connects the active outlet (10) of application valve A to the inlet (11) of release valve R. The active outlet (12) of release valve R is vented to atmosphere. Pipe (9) is connected to one inlet port (13) of double check valve device DCV.

Pneumatic backup brake control (20) comprises an emergency portion (21) of a conventional, well-known, AB type freight brake control valve device, such as the industry standard ABD and ABDX type, for example, and an emergency reservoir ER. Emergency portion (21) may be mounted on a standard AB type pipe bracket (22) to which brake pipe BP is connected via a branch pipe (23). Emergency reservoir ER is connected to pipe bracket (22) via a pipe (24) and to branch pipe (23) via a pipe (25) having a one-way check valve (26). The other inlet port (27) of double check valve DCV is connected via pipe (28) to pipe bracket (22). In that no service portion is employed with pipe bracket (22), the pipe bracket exhaust port and auxiliary reservoir port are blanked. Also, a blanking plate (22A) is affixed to the pipe bracket face on which the absent service portion is normally mounted.

Relay valve RV is a conventional type relay having a control chamber to which the outlet port (29) of double check valve DCV is connected via an inlet port (30); a supply port (31) to which supply reservoir SR is connected via branch pipe (4) and a pipe (32); a delivery port (33) to which brake cylinder BC is connected via pipe (34); and an exhaust port (35).

Electro-pneumatic Brake Operation

When brake pipe BP is charged to its operating pressure, control wire CW issues a brake release signal to microprocessor CPU, which deenergizes the solenoid operators of application valve A and release valve R. In their deenergized condition, as shown, application valve A is set in a normally closed position by its return spring and release valve R is set in a normally open position by its return spring. The control chamber of relay valve RV is thus vented via control port (30), ports (29), (13) of the double check valve DCV, and outlet (12) of release valve R. Relay valve RV thus assumes its release position in which brake cylinder BC is vented via pipe (33) and exhaust port (35).

Concurrently, the charged brake pipe BP supplies air to supply reservoir SR via check valve (5), choke (6) and branch pipe (4); to emergency reservoir ER via branch pipe and passage (23), check valve (26) and pipe (25); and from branch pipe and passage (23) to pipe bracket (22). As will hereinafter be explained, an increase in brake pipe pressure causes emergency portion (21) to assume its release condition in which the other inlet port (27) of double check valve DCV is vented via pipe (28) and an exhaust port (36) provided in emergency portion (21), in accordance with the present invention.

Consequently, the car brakes are released and the car brake system (1) is charged preparatory to a subsequent service brake application via the electro-pneumatic brake control (10) or via the backup brake control (20) in the event of a break-in-two or an emergency brake application, as will now be explained.

When a service brake application is desired, the electro-pneumatic brake control (10) is operated by a brake command signal transmitted to microprocessor CPU via control wire CW. Microprocessor CPU in turn, energizes the solenoid operators of application valve A and release valve R via wire (2) and wire (3) causing application valve A to open and release valve R to close. This results in double check valve inlet port (13) being cut off from atmosphere at release valve R and concurrently connected to supply reservoir SR via the connected ports (7), (10) of open application valve A, and pipe (8). The relay valve control port (30) is thus pressurized via outlet port (29) of double check valve DCV, causing relay valve RV to, in turn, connect compressed air from supply reservoir SR to brake cylinder BC via pipes (4), (32), relay valve ports (31), (33) and pipe (34) at a pressure corresponding to the pressure at control port (30).

When the brake cylinder pressure matches the pressure called for by the brake command signal transmitted via wire CW, as monitored by microprocessor CPU, the solenoid operator of application valve A is deenergized. Application valve A is thus spring returned to its normally closed position in which further supply of pressure from supply reservoir SR to brake cylinder BC is interrupted.

Brake cylinder pressure under electro-pneumatic brake control may be increased in accordance with an increased brake command signal, as above-explained, or may be release in accordance with the charging of the brake system, as explained. During this time, brake pipe pressure is maintained at the desired operating pressure and consequently emergency portion (21) of pneumatic backup brake system (20) is held in abeyance, it being understood that emergency portion (21) is only responsive to emergency rates of reduction of brake pipe pressure, in accordance with the well-known operation of AB type control valve emergency portions.

Pneumatic Backup Brake Operation

In the event an emergency brake application is desired, brake pipe pressure is reduced at an emergency rate, as for example, by the locomotive engineer through the engineer's brake valve device (not shown) on the locomotive. Alternatively, an emergency brake application may be instigated by a train break-in-two, which also produces an emergency rate of reduction of brake pipe pressure. In response to either of the foregoing, the emergency portion (21) at each car of a train establishes a local "quick action" reduction of brake pipe pressure via its vent valve device (40) to propagate the emergency rate of reduction through the train brake pipe, in a well-known manner.

Figure 2:
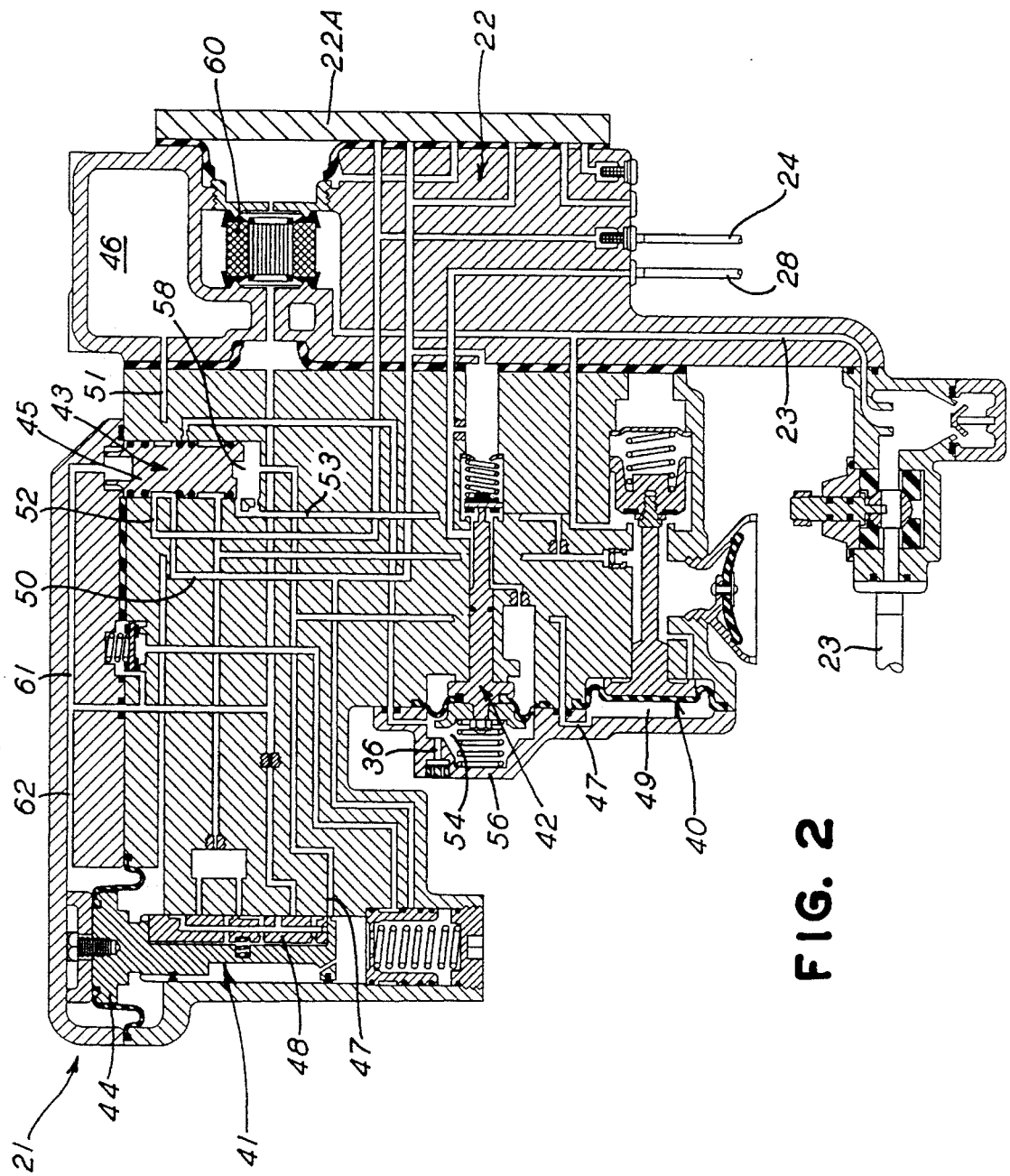
FIG. 2 is a diagrammatic view of the emergency portion of FIG. 1 shown in emergency application position and modified in accordance with a first embodiment of the present invention.
Figure 3:
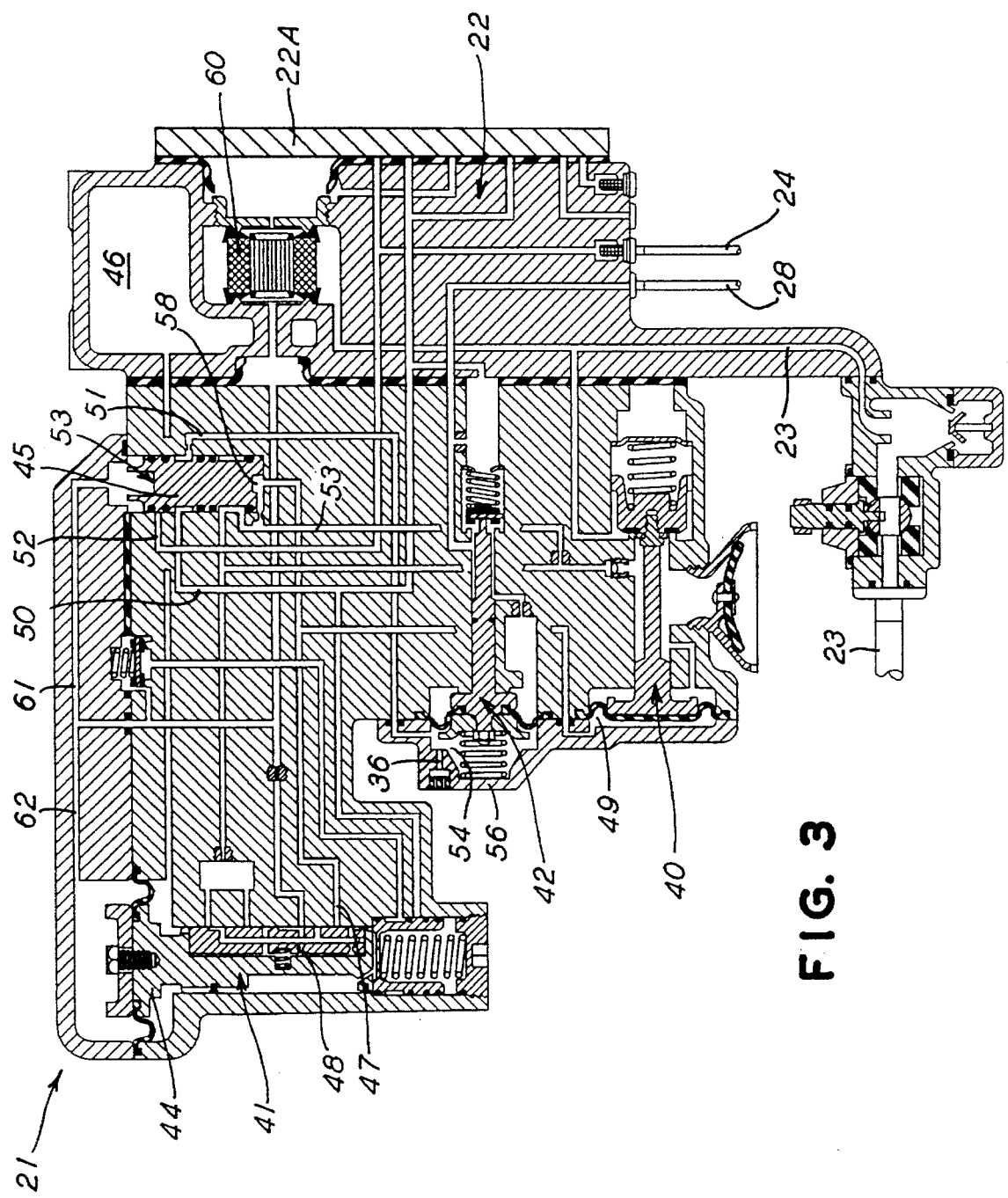
FIG. 3 is a diagrammatic view of the modified emergency portion of FIG. 2 shown in release position.

In accordance with a first embodiment of the invention, as shown in FIGS. 2 and 3, emergency portion (21) includes, in addition to vent valve device (40), an emergency valve (41) and an inshot valve (42), all of which function in a well-known manner consistent with operation of the industry standard AB type control valve devices.

Also included in emergency portion (21) is the high pressure valve (43) having a spool member (45) that has been modified by removal of its return spring so as to be bistable in its release and application positions, in accordance with the first embodiment of the present invention.

The emergency reduction of the brake pipe pressure is effective above piston member (44) of emergency valve (41), and above spool member (45) of high pressure valve (43). The quick action chamber pressure effective in pipe bracket chamber (46) and on the underside of emergency piston member (44) is only capable of reducing at a service rate and is therefore unable to counteract the emergency rate of pressure reduction effective above piston member (44). Consequently, a pressure differential is developed across emergency piston member (44) to force the piston member to its upper-most emergency application position, as shown in FIG. 2.

In this emergency application position, quick action pressure is connected from pipe bracket chamber (46) and the underside of emergency piston member (44), around the piston stem to a pilot passage (47) that is uncovered by the emergency piston slide valve (48). Pilot passage (47) leads to the control chamber (49) of vent valve device (40), to initiate the aforementioned "quick action" progation of the emergency brake pipe pressure reduction; and concurrently to control chamber (58) at the underside of high pressure spool member (45), to force the spool member (45) to its upper-most application position, as shown in FIG. 2.

In this application position of high pressure valve (43), a brake cylinder pilot control passage (50) is cut-off from a vent passage (51) and is concurrently connected to a supply passage (52) by spool member (45). Passage (50) is connected to inlet (27) of double check valve DCV via inshot valve (42) and pipe (28), while passage (52) is connected to emergency reservoir ER via pipe (24). Consequently, emergency reservoir pressure is connected to the control port (30) of relay valve RV via pipe (24), passage (52), the high pressure valve spool member (45), passage (50), inshot valve (42), pipe (28), inlet (27) and outlet (29) of double check valve DCV. In addition, the quick action pilot pressure effective in control chamber (58) at the underside of spool member (45) is connected to a vent passage (53) to provide the well-known quick action pressure blowdown function. Being bistable, spool member (56) remains, however, in its application position until brake pipe pressure is subsequently recharged indicative of a desired brake release, as hereinafter explained.

Control port (30) of relay valve RV is thus pressurized according to the operating pressure to which brake pipe BP and thus emergency reservoir ER have been charged, the emergency reservoir pressure being prevented from following the brake pipe pressure reduction by one-way check valve (26). It should also be understood that the maximum service brake pressure capable of being supplied to inlet (13) of double check valve DCV is less than the emergency reservoir pressure effective at double check valve inlet (27).

Therefore, the emergency reservoir pressure under control of the pneumatic backup brake control (20) will be connected to the relay valve control port (30) via double check valve DCV regardless of the degree of brake called for by the electro-pneumatic brake control (10). Relay valve RV will, in turn, connect supply reservoir SR pressure to brake cylinder BC, it being understood that one-way check valve (5) prevents the supply reservoir pressure from being reduced with brake pipe pressure. Since the supply reservoir SR is charged from brake pipe BP, the pressure will be the same as that of emergency reservoir ER and will thus supply air to brake cylinder BC until full pressure equalization therebetween exists. The volume of supply reservoir SR is selected so that for a given brake pipe operating pressure, the emergency brake cylinder pressure will exceed the maximum service brake cylinder pressure provided by the electro-pneumatic brake control (10).

Further, in accordance with the first embodiment of the present invention, vent passage (51) is preferably vented at the inshot valve control chamber (54), by providing the aforementioned vent port (36) in cover (56), for example. In the standard AB type control valve emergency portion, this control chamber (54) is connected to passage (51), but is unvented, being subject to service brake cylinder pressure. In the absence of a control valve service portion in brake system (1), however, no service brake cylinder pressure is ever provided at control chamber (54) and thus the aforementioned venting of control chamber (54) to provide vent passage (51) has no adverse consequence. Moreover, inshot valve (42) will operate in the usual manner to provide a two-stage buildup of the emergency brake pressure in response to operation of the pneumatic backup brake control (20).

Referring now to FIG. 3, when it is desired to release the emergency backup brake application, brake pipe BP is re-charged to its operating pressure following the aforementioned blowdown of the quick action chamber (46) pressure. Brake pipe pressure is thus supplied concurrently to the upper side of high pressure valve spool member (45) via branch pipe (23), filter (60), and passage (61); and to the upper side of emergency valve piston member (44) via a branch (62) of passage (61). High pressure spool member (45) is shifted downward to its release position, as shown, in which brake cylinder pilot control passage (50) is cut-off from emergency reservoir supply passage (52) and concurrently connected to vent passage (51) by spool member (45). Relay valve control pressure at port (30) is thus vented to atmosphere via double check valve DCV, pipe (28), inshot valve (42), passage (50), spool member (45), passage (51), control chamber (54) of inshot valve (42), and vent port (36) provided in cover (56) in accordance with the first embodiment of the present invention. Relay valve RV in turn exhausts brake cylinder BC pressure via pipe (34) and the relay valve exhaust port (35) to fully release the pneumatic emergency backup brake application.

At the same time, emergency valve piston (44) is also forced downward to its release position in which quick action pilot passage (47) is cut-off from quick action chamber pressure by slide valve (48), thereby resetting the emergency valve (41).

Figure 4:
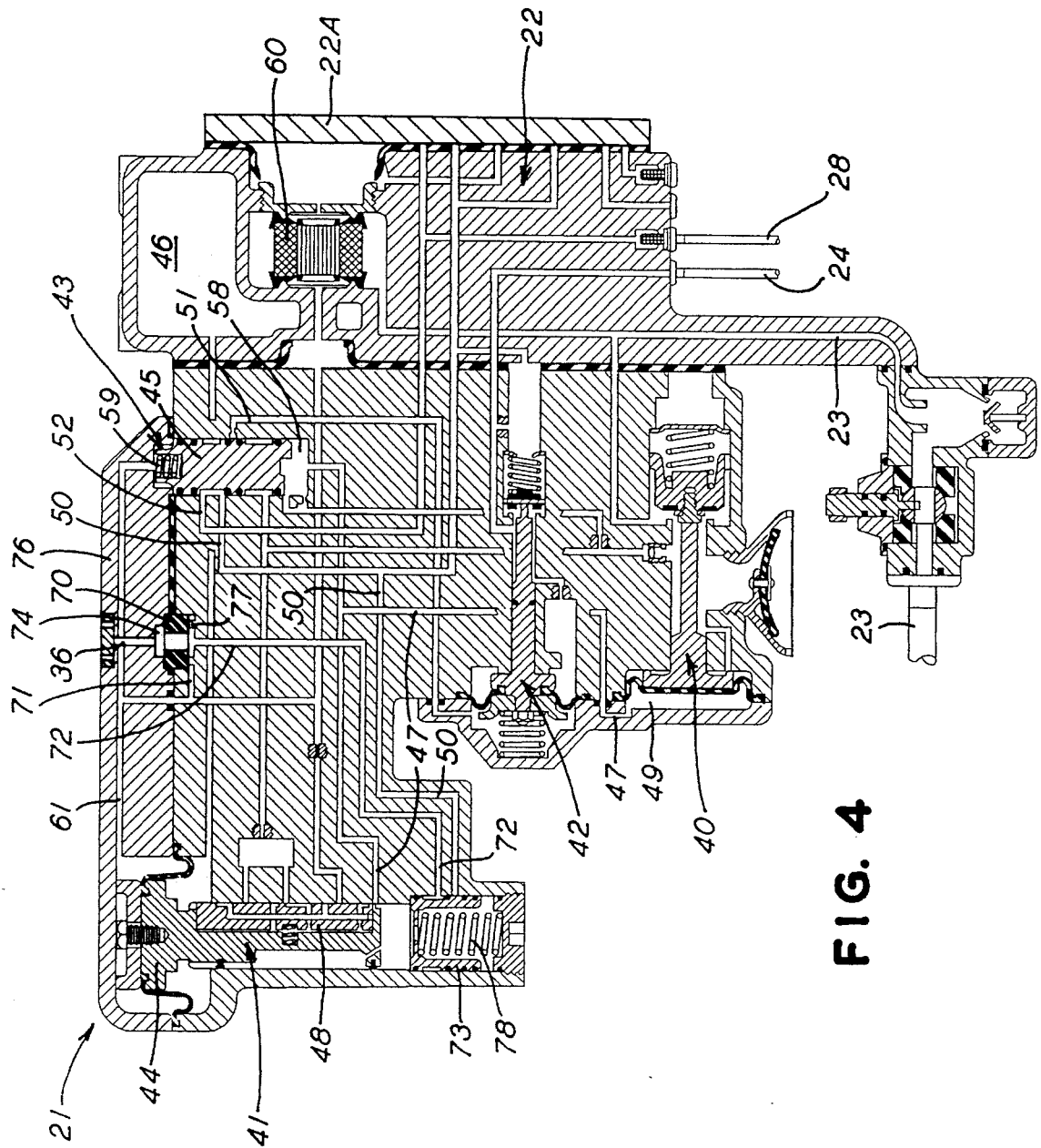
FIG. 4 is a diagrammatic view of the emergency portion of FIG. 1 shown in emergency application position and modified in accordance with a second embodiment of the present invention.
Figure 5:
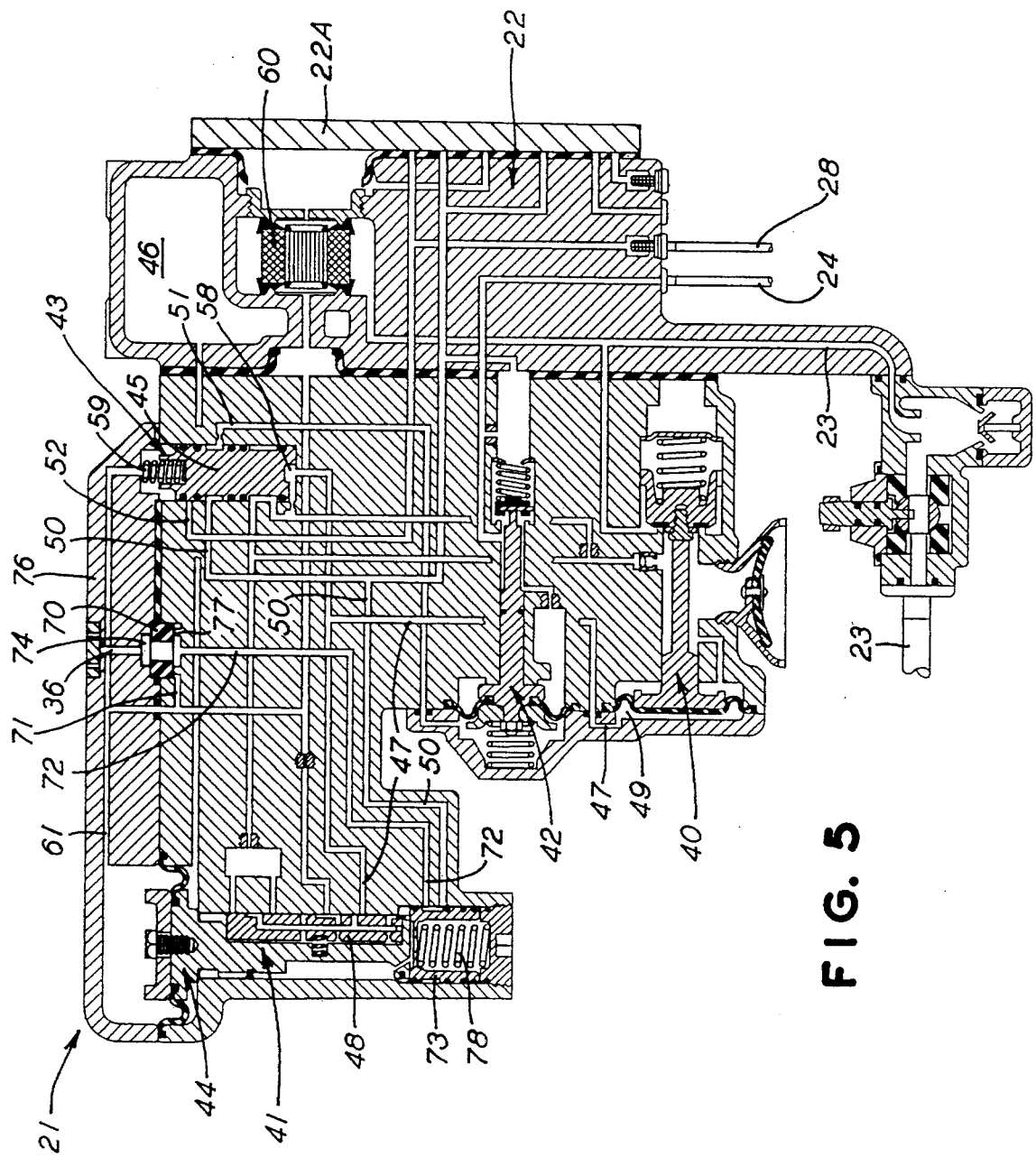
FIG. 5 is a diagrammatic view of the modified emergency portion of FIG. 4 shown in release position.

In a second embodiment of the invention shown in FIGS. 4 and 5, emergency portion (21) is modified by replacing the emergency accelerated release check valve with an elastomeric plug (70) to isolate a branch passage (71) of brake pipe passage (61) from a vented backdump passage (72) that terminates at one end at the backdump spool (73) and at the other end in the vacated accelerated release check valve cavity (74). The modification further includes venting cavity (74), preferably by providing the aforementioned vent port (36) in the emergency portion top cover (76) so as to terminate in cavity (74).

In addition to the foregoing modifications, emergency portion (22), further includes vent valve device (40), emergency valve (41), inshot valve (42), and high pressure valve (43), all of which function in a well-known manner consistent with operation of the industry standard AB type control valve devices.

In response to an emergency rate of reduction of brake pipe pressure, as explained hereinbefore, service valve piston member (44) is forced to its upper-most emergency application position (FIG. 4), in which pilot passage (47) is uncovered by slide valve (48). In this emergency application position, quick action pressure is connected, from pipe bracket chamber (46) and the underside of emergency piston (44), around the piston stem to a pilot passage (47) that is uncovered by emergency piston slide valve (48). Pilot passage (47) leads to the control chamber (49) of vent valve device (40) to initiate the "quick action" propagation of the emergency brake pipe pressure reduction; and concurrently to control chamber (58) at the underside of high pressure spool member (45), to force the spool member to its upper-most application position, as shown.

In this application position of high pressure valve (43), a brake cylinder pilot control passage (50) is cut-off from a passage (51) and is concurrently connected to a supply passage (52) by spool member (45). Passage (50) is connected to inlet (27) of double check valve DCV via inshot valve (42) and pipe (28); passage (51) is connected to inshot valve control chamber (54); and passage (52) is connected to emergency reservoir ER via pipe (24). Consequently, emergency reservoir air is connected to the control port (30) of relay valve RV via pipe (24), passage (52), the high pressure spool member (45), passage (50), inshot valve (42), pipe (28), and inlet (27) and outlet (29) of double check valve DCV. In addition, the quick action pilot pressure effective in control chamber (58) at the underside of high pressure spool member (45) is connected to a vent passage (53) to initiate the well-known quick action pressure blowdown function.

Relay valve RV operates in response to the emergency reservoir pressure effective at control port (30) to connect supply reservoir SR pressure to brake cylinder BC via delivery port (33) and pipe (34) until full pressure equalization therebetween exists. The volume of supply reservoir SR is selected so that for a given brake pipe operating pressure, the emergency brake cylinder pressure will exceed the maximum service brake cylinder pressure provided by the electro-pneumatic brake control (10). Following a predetermined time delay, as determined by the controlled blowdown of quick action chamber pressure, the high pressure valve return spring (59) is effective to reset spool member (45) to its release position.

Referring now to FIG. 5, when it is desired to release the emergency backup brake application, brake pipe BP is recharged to its operating pressure. This brake pipe pressure is effective at the upper face of emergency valve piston (44) to force the piston member to accelerated application position, as is well-known. In this position, the stem of the piston member (44) engages the back dump spool (73), forcing it to release position, as shown. In this position, brake cylinder pilot control passage (50) is connected to the vented backdump passage (72) via the backdump spool. Consequently, the relay valve RV control pressure at port (30) is vented to atmosphere via double check valve DCV, pipe (28), inshot valve (42), passage (50) leading to backdump spool (73), vented backdump passage (72), a passage through elastomeric plug (70) in cavity (74), and the vent passage and port (36) in cover (76). Relay valve RV in turn exhausts brake cylinder BC pressure via pipe (34) and the relay valve exhaust port (35) to fully release the pneumatic emergency backup brake application.

It will be understood in accordance with the second embodiment of the invention that elastomeric plug (70) is fixed in cavity (74) between cover (76) and the accelerated release check valve seat (77) to prevent brake pipe pressure in passage (71) from exhausting via vent passage and port (36) in cover (76).

As the brake pipe pressure and quick action pressure approach equalization, emergency piston (44) is moved to its release and charging position by the backdump spool return spring (78) and the backdump spool is accordingly reset to its lap position in which the spool connection between passages (72) and (50) is interrupted and final charging of brake pipe pressure continues with the brakes fully released.

I claim:

1. A pneumatic backup brake arranged with an electro-pneumatic brake for a railroad car having a brake pipe charged with fluid under pressure, brake means, an emergency reservoir, and a control valve including a quick action pressure chamber, said emergency reservoir and said quick action pressure chamber being charged via said brake pipe, wherein said control valve device comprises:
   a. a first flow path via which fluid under pressure is connected from said emergency reservoir to said brake means;
   b. a second flow path via which fluid under pressure is released from said brake means to atmosphere;
   c. valve means having a first operable condition in which said first flow path is established and said second flow path is interrupted in response to an emergency rate of reduction of said brake pipe fluid pressure and a second operable condition in which said first flow path is interrupted and said second flow path is established; and
   d. emergency means for effecting operation of said valve means to said second condition only in response to said brake pipe being recharged with fluid under pressure following a reduction thereof in accordance with an emergency brake application.

2. A control valve device as recited in claim 1, wherein said emergency means comprises:
   a. an emergency piston having a release position and an emergency application position; and
   b. pilot valve means carried by said emergency piston for establishing said first operable condition of said valve means when said emergency piston is operated to said emergency application position in response to a reduction of said brake pipe fluid pressure at an emergency rate.

3. A control valve device as recited in claim 2, wherein said valve means comprises a piston spool member subject on one side to the fluid pressure of said brake pipe and on the other side to the fluid pressure of said quick action chamber, said piston spool member being operated to a first position corresponding to said first operable condition in accordance with a predominance of said quick action chamber fluid pressure effective at said other side thereof and operated to a second position corresponding to said second operable condition in accordance with a predominance of said brake pipe fluid pressure effective at said one side thereof.

4. A control valve device as recited in claim 3, further comprising a third flow path via which said quick action chamber fluid pressure effective at said other side of said spool member is vented to atmosphere in said first position thereof.

5. A control valve device as recited in claim 2, wherein said valve means includes a spool member with which said emergency piston is engageable in said release position wherein said spool member is operated to a second position to establish said second operable condition of said valve means.

6. A control valve device as recited in claim 5, further comprising:
   a. a third flow path;
   b. a cavity via which said second flow path is communicated with said third flow path; and
   c. plug means in said cavity for interrupting said communication of said second and third flow paths.

7. A control valve device as recited in claim 6, further comprising:
   a. a body portion in which said cavity is formed in a face thereof, said cavity having a valve seat therein; and
   b. a cover portion engageable with said face of said body portion, said plug means being clamped between said valve seat and said cover portion under compression.

8. A control valve device as recited in claim 7, wherein said plug means is an elastomeric member.

9. A control valve device as recited in claim 5, further characterized in that said spool member is spring-loaded to establish a first position thereof in the absence of said engagement thereof by said piston member to establish said first operable condition of said valve means.

10. A control valve device as recited in claim 1, further comprising inshot valve means for controlling the build-up of fluid pressure at said brake means, said inshot valve means having a vented control chamber in said second flow path.

* * * * *